United States Patent [19]
Shikata et al.

[11] Patent Number: 6,023,416
[45] Date of Patent: Feb. 8, 2000

[54] DC POWER SUPPLY APPARATUS INCLUDING BOOSTING/LOWERING CONVERTER UNIT AND CONTROL

[75] Inventors: Kunio Shikata, Minoo; Toru Arai, Kyoto; Toshikazu Fujiyoshi, Kawanishi; Takeshi Omura, Kyoto, all of Japan

[73] Assignee: Sansha Electric Manufacturing Company, Limited, Osaka, Japan

[21] Appl. No.: 09/175,830

[22] Filed: Oct. 20, 1998

[30] Foreign Application Priority Data

Oct. 20, 1997 [JP] Japan ..................................... 9-306558

[51] Int. Cl.[7] ........................... H02M 3/335; H02M 3/24; H02M 7/538
[52] U.S. Cl. ................................. 363/17; 363/24; 363/98; 363/134
[58] Field of Search .................................. 363/17, 24, 25, 363/95, 98, 131, 132, 134, 101

[56] References Cited

U.S. PATENT DOCUMENTS

| | | | |
|---|---|---|---|
| 4,150,423 | 4/1979 | Boschert | 363/90 |
| 4,504,895 | 3/1985 | Steigerwald | 363/17 |
| 4,742,535 | 5/1988 | Hino et al. | 378/105 |
| 5,119,283 | 6/1992 | Steigerwald et al. | 363/37 |
| 5,272,313 | 12/1993 | Karino et al. . | |
| 5,559,684 | 9/1996 | Ohms et al. | 363/25 |
| 5,659,463 | 8/1997 | Lee | 363/25 |
| 5,736,842 | 4/1998 | Jovanovic | 363/25 |
| 5,822,201 | 10/1998 | Kijima | 363/25 |

FOREIGN PATENT DOCUMENTS 3-71218  11/1991  Japan .

OTHER PUBLICATIONS

Moriguchi et al.; copending patent application 08/968,054 filed Nov. 12, 1997 entitled Power Supply Apparatus for Plasma Arc Utilizing Equipment.
Moriguchi et al.; copending patent application 09/152,017 filed Sep. 11, 1998 entitled "Inverter and DC Power Supply Apparatus with Inverter Used Therein".
Moriguchi et al.; copending patent application 09/159,485 filed Sep. 23, 1998 entitled "DC Power Supply Apparatus".

*Primary Examiner*—Peter S. Wong
*Assistant Examiner*—Bao Q. Vu
*Attorney, Agent, or Firm*—Duane, Morris & Heckscher LLP; William H. Murray

[57] ABSTRACT

An input-side rectifier of a DC power supply apparatus receives and rectifies an AC voltage selected from first and second groups of AC voltages. The AC voltages in the second group are lower than those of the first group. A voltage boosting/lowering converter boosts or lowers the output voltage of the input-side rectifier to a voltage having a predetermined value. An inverter converts the output voltage of the voltage boosting/lowering converter to a high-frequency voltage. A voltage transformer transforms the high-frequency voltage from the inverter. An output-side rectifier rectifies the transformed high-frequency voltage from the transformer.

5 Claims, 1 Drawing Sheet

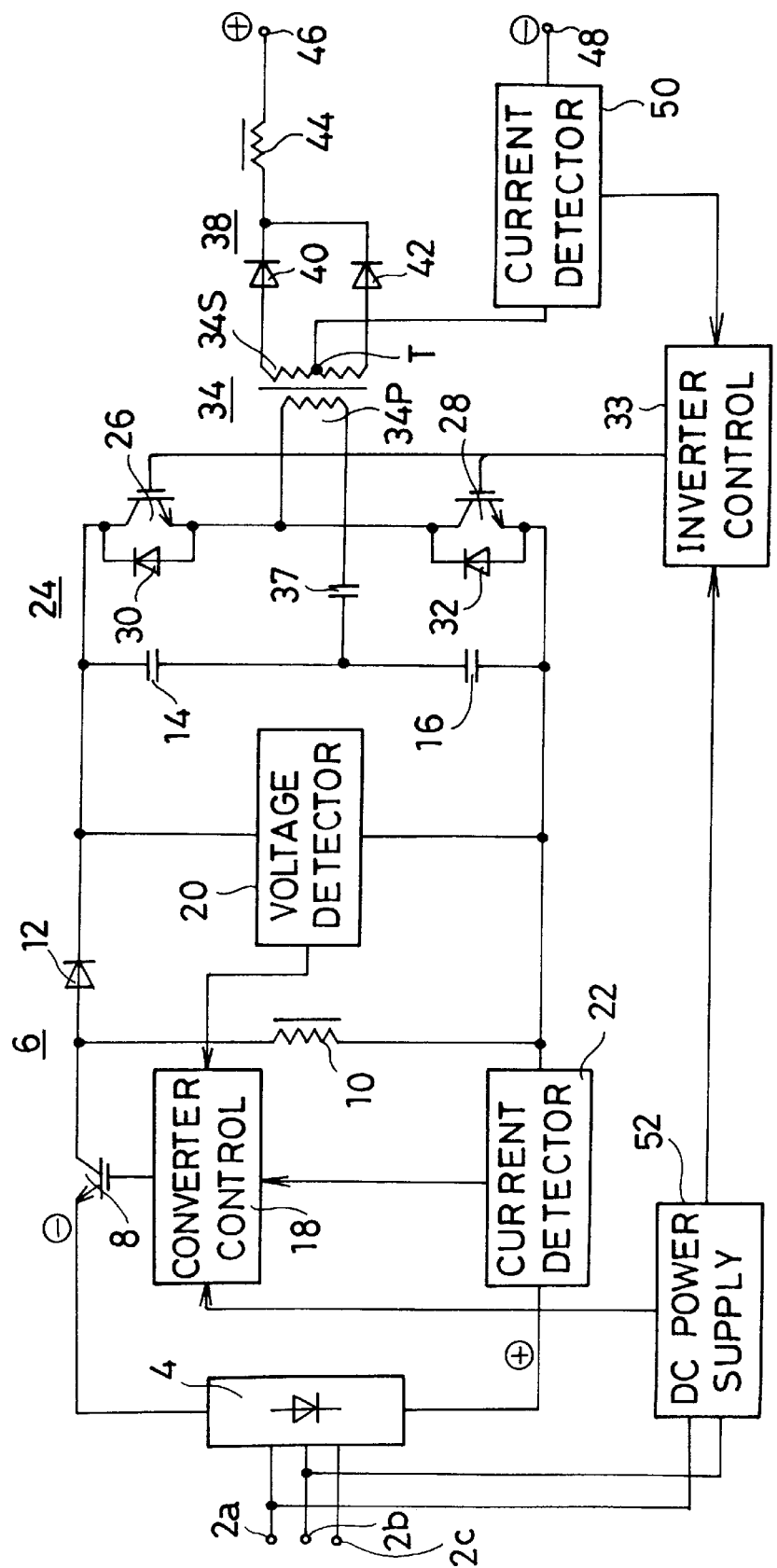

DC POWER SUPPLY APPARATUS INCLUDING BOOSTING/LOWERING CONVERTER UNIT AND CONTROL

This application is based on Japanese Patent Application No. HEI 9-306558 filed on Oct. 20, 1997, which is incorporated herein by reference.

This invention relates to a DC power supply apparatus for providing DC power by converting an AC voltage to a DC voltage and, more particularly, to such an apparatus operable from selected one of a plurality of AC voltages of different values.

BACKGROUND OF THE INVENTION

DC power supply apparatuses operable from selected one of a plurality of AC voltages are disclosed, for example, in U.S. Pat. No. 5,272,313 issued to K. Karino et al. on Dec. 21, 1993 and in Japanese Examined Patent Publication No. HEI 3-71218 published on Nov. 12, 1991.

According to U.S. Pat. No. 5,272,313, a commercial AC voltage of either 200 V or 400 V can be applied to input terminals of a DC power supply apparatus, and the applied voltage is rectified by an input-side rectifier. The rectified voltage is converted into a high-frequency voltage by two inverters, the inputs of which can be selectively connected in series and in parallel with each other by means of switches. High-frequency voltages from the inverters are rectified by output-side rectifiers. When the voltage supplied to the input-side rectifier is of 200 V, the switches connect the inputs of the two inverters in parallel, and if the voltage supplied to the input-side rectifier is of 400 V, the two inverters are connected in series. Thus, the value of the voltage supplied to each inverter is the same regardless of whether the input voltage is of 200 V or 400 V.

According to Japanese Examined Patent Publication No. HEI 3-71218, a commercial AC voltage of 100 V or 200 V is applied to input terminals of the DC power supply apparatus and is rectified by an input-side rectifier. The rectified voltage is voltage-boosted to a predetermined voltage by a voltage-boosting converter. The boosted voltage is converted to a high-frequency voltage by an inverter, and the high-frequency voltage is voltage transformed by a transformer. The transformed voltage is rectified by an output-side rectifier. Thus, whether the voltage applied to the input-side rectifier is of 100 V or 200 V, the voltage the inverter receives is always the predetermined voltage.

The power supply apparatus according to U.S. Pat. No. 5,272,313 has a disadvantage that it requires two inverters. In addition, currents and voltages to be applied to the two inverters must be balanced with respect to each other, and, therefore, the power supply apparatus requires a balancing circuit arrangement. Thus, the power supply apparatus should be large in size.

According to Japanese Examined Patent Publication No HEI 3-71218, the value of the voltage to be applied to the power supply apparatus is 100 V or 200 V. The value of commercial AC voltages in the world, however, widely ranges. The values of the commercial AC voltages in the world are 200 V, 208 V, 230 V, 240 V, 380 V, 415 V, 440 V, 460 V and 575 V, for example.

In order to use the power supply apparatus disclosed in this Japanese patent publication with such widely ranging voltages, it is necessary to modify it such that the voltage-boosting converter provide, as the predetermined voltage, a voltage having a peak value of the voltage resulting from rectifying the highest voltage of 575 V, i.e. 813 V=575 V×√2. Then, when the lowest voltage, 200 V, is the input voltage, the peak value of the voltage resulting from rectifying it, i.e. 283 V (=200 V×√2) must be boosted up to the predetermined voltage of 813 V. In other words, the peak value must be multiplied by about three. Also, switching devices, such as IGBTs, used in the inverter have to withstand higher voltages so that the power supply apparatus can be used with a voltage of 813 V.

Switching devices which can withstand a voltage of 1200 V are available now. However, even if such high withstand voltage IGBTs are used, the margin of the withstand voltage of IGBTs is narrow relative to the 813 V voltage, and, therefore, the possibility of the IGBTs being damaged is high. In addition, high withstand voltage switching devices are not in the market. High withstand voltage switching devices are inferior in switching characteristic to low withstand voltage switching devices, and are expensive.

Therefore, an object of the present invention is to provide a DC power supply apparatus which is relatively small in size and can use low withstand voltage switching devices for its inverter.

SUMMARY OF THE INVENTION

In order to achieve the above-described object, a DC power supply apparatus according to an embodiment of the present invention includes an input-side rectifier which receives and rectifies an AC voltage in first and second groups of AC voltages having different values. The AC voltages of the second group are lower than the AC voltages of the first group.

A voltage boosting/lowering converter converts the output voltage of the input-side rectifier to a predetermined voltage. An inverter converts the output voltage of the voltage boosting/lowering converter to a high-frequency voltage. The high-frequency output voltage of the inverter is voltage-transformed by a transformer. The voltage-transformed high-frequency voltage from the transformer is rectified by an output-side rectifier.

The value of the predetermined voltage outputted by the voltage boosting/lowering converter may be the peak value of the voltage resulting from rectifying a voltage selected from the voltages, excluding the highest one, of the first and second groups.

The value of the predetermined voltage may be the peak value of the voltage resulting from rectifying a voltage selected from the voltages, excluding the highest one, of the first group.

The voltage boosting/lowering converter may comprise a reactor, and a high-frequency switching device, which connects the reactor between output terminals of the input-side rectifier. The converter includes further a capacitor, and a unidirectional device connected between the reactor and the capacitor in such a manner that current can flow therethrough from the reactor to the capacitor when the high-frequency switching device is off.

The voltage boosting/lowering converter may include a converter control unit, which turns on and off the high-frequency switching device of the converter, and the inverter may include high-frequency switching devices for switching the input-side rectifier output at a high frequency, and an inverter control unit for ON-OFF controlling the high-frequency switching devices of the inverter. A DC supply unit, which receives the AC voltage supplied to the input-side rectifier or the output voltage of the voltage boosting/lowering converter and prepares a DC supply voltage, supplies the DC supply voltage to the voltage boosting/lowering converter control unit and to the inverter control unit.

BRIEF DESCRIPTION OF THE DRAWING

The sole FIGURE is a circuit diagram, partially in block, of a DC power supply apparatus according to one embodiment of the present invention.

DESCRIPTION OF PREFERRED EMBODIMENT

A DC power supply apparatus according to an embodiment of the invention is shown in the sole FIGURE. The DC power supply apparatus has input terminals 2a, 2b and 2c, to which an AC voltage commercially available in an area where the DC power supply apparatus is used is applied. The voltage applied is one of AC voltages in first and second groups. The voltages of the first group may be voltages having effective values of, for example, 380 V, 415 V, 460 V and 575 V, and the second group may include voltages having effective values of, for example, 200 V, 208 V, 230 V and 240 V.

An input-side rectifier 4 is coupled to the input terminals 2a–2c for full-wave or half-wave rectifying the commercial AC voltage applied to the input terminals 2a–2c.

The output of the input-side rectifier 4 is applied to a voltage boosting/lowering converter 6. Specifically, a high-frequency switching device of the converter 6 is connected to a negative output terminal of the input-side rectifier 4. For example, the emitter of an IGBT 8 acting as the high-frequency switching device is connected to the negative output terminal of the input-side rectifier 4. The IGBT 8 has its collector connected through a reactor 10 to a positive output terminal of the rectifier 4. The collector is connected also to a unidirectional device, for example, a diode 12. The anode of the diode 12 is connected to the collector of the IGBT 8, and the cathode is connected to the junction of the positive output terminal of the input-side rectifier 4 and the reactor 10 through a series combination of capacitors 14 and 16.

The IGBT 8 has a control electrode, e.g. a gate electrode, which is connected to a converter control unit 18. When the converter control unit 18 applies a control signal to the gate electrode, the IGBT 8 is rendered conductive, so that current can flow from the positive output terminal of the input-side rectifier 4 to the reactor 10 to thereby store energy in the reactor 10. When the IGBT 8 is conductive, the diode 12 is nonconductive because a negative voltage is applied to its anode.

Upon the disappearance of the control signal, counter-electromotive force is generated in the reactor 10 to sustain the current flow. Since the diode 12 is conductive the current flows through the diode 12 into the capacitors 14 and 16.

The ratio of the ON-period during which the IGBT 8 is conductive to the OFF-period during which the IGBT 8 is nonconductive is adjusted to develop either a boosted version or a lowered version of the output voltage of the rectifier 4 across the series combination of the capacitors 14 and 16.

The output voltage of the voltage boosting/lowering converter 6 developed, for example, across the series combination of the capacitors 14 and 16 is detected by a voltage detector 20. The detector 20 develops a signal representative of the detected output voltage of the voltage boosting/lowering converter 6. This detected voltage representative signal is applied to the converter control unit 18, which varies the ratio of the ON-period and the OFF-period of the IGBT 8 in such a manner that the voltage developed across the series combination of the capacitors 14 and 16 can be a predetermined voltage. The predetermined voltage may be, for example, a voltage having a peak value of the voltage resulting from rectifying the second highest voltage of the first voltage group, namely, the voltage of 460 V. That is, the predetermined voltage has a value of about 650 V (=460 V× $\sqrt{2}$).

Thus, the voltage boosting/lowering converter 6 lowers the output voltage of the input-side rectifier 4 when the DC power supply apparatus is used with a voltage of 575 V applied to the input terminals 2a–2c. Otherwise, i.e. when any one of the other voltages of the first group or any one of the voltages of the second group is inputted, the converter 6 boosts the output voltage of the rectifier 4 to provide a voltage of about 650 V regardless of the input voltage applied to the input terminals 2a–2c.

A current detector 22 is connected to the positive output terminal of the input-side rectifier 4 to detect the output current of the input-side rectifier 4. A detected current representative signal developed by the current detector 22 is applied to the converter control unit 18. The converter control unit 18 controls the IGBT 8 in such a manner that the output current from the input-side rectifier 4 is in phase with one of the three phases of the voltages applied to the input terminals 2a–2c, so that a power factor of unity is provided.

In addition to the voltage boosting/lowering converter 6, the DC power supply apparatus includes an inverter 24, which includes the series combination of the capacitors 14 and 16. In parallel with the series combination of the capacitors 14 and 16, a series combination of high-frequency semiconductor switching devices, e.g. IGBTs 26 and 28, is connected. More specifically, the collector-emitter conduction paths of the IGBTs 26 and 28 are connected in series, and the series combination is connected in parallel with the series combination of the capacitors 14 and 16.

Flywheel diodes 30 and 32 are connected in inverse parallel with the collector-emitter conduction paths of the IGBTs 26 and 28, respectively.

The IGBTs 26 and 28 have gate electrodes, which receive control signals from an inverter control unit 33. In response to the control signals, the IGBTs 26 and 28 are alternately rendered conductive and nonconductive. Also, they are controlled such that when one of the IGBTs 26 and 28 is rendered conductive, the other is rendered nonconductive, and vice versa.

Like this, the inverter 24 is arranged in a half-bridge inverter configuration, and converts the predetermined DC voltage, e.g. a voltage of about 650 V, applied thereto from the voltage boosting/lowering converter 6 to a high-frequency voltage.

Output terminals of the inverter 24 are provided by the junction of the emitter of the IGBT 26 and the collector of the IGBT 28 and the junction of the capacitors 14 and 16. A primary winding 34P of a transformer 34 is connected between these output terminals through a DC blocking capacitor 37. Thus, the high-frequency voltage from the inverter 24 is voltage transformed by the transformer 34, and a transformed voltage is induced in a secondary winding 34S of the transformer 34.

The secondary winding 34S has an intermediate tap T, and its two ends are connected to the anodes of rectifying diodes 40 and 42 of an output-side rectifier 38. The cathodes of the diodes 40 and 42 are connected together to a positive output terminal 46 of the DC power supply apparatus through a smoothing reactor 44. The intermediate tap T is connected to a negative output terminal 48 of the apparatus. A high-frequency voltage induced in the secondary winding 34S is rectified and smoothed, and the rectified and smoothed voltage is developed between the output terminals 46 and 48.

A current detector 50 is connected between the intermediate tap T and the negative output terminal 48 for detecting current which will flow in a load to be connected between the output terminals 46 and 48. A signal representative of the current detected by the current detector 50 is applied from the detector 50 to the inverter control unit 33. The inverter control unit 33 controls the ON and OFF periods of the IGBTs 26 and 28, during which the IGBTs 26 and 28 are conductive and nonconductive, such that the current representative signal can have a predetermined fixed value. In other words, the inverter control unit 33 provides constant current control.

With the above-described arrangement, whichever one of the voltages of the first and second groups is applied to the input terminals 2a–2c, a DC voltage of the fixed value is applied to the inverter 24 from the converter 6. As the fixed value of the voltage to be applied to the inverter 24, the peak value of a voltage resulting from rectifying a voltage than the highest voltage in the first group can be employed because the converter 6 is a voltage boosting/lowering converter, and is not a voltage boosting converter. Then, commercially available inexpensive devices which have a good switching characteristic and a low withstand voltage can be used as the IGBTs 26 and 28 of the inverter 24.

The value of the output voltage of the voltage boosting/lowering converter 6 may be the peak value of a voltage resulting from rectifying one of the voltages in the second group, e.g. the lowest voltage of 200 V. In such a case, however, large current will flow in the primary winding 34P of the transformer 34, which causes increased power loss, and, therefore, a thick wire must be used for the winding 34P. It is, therefore, preferable to set the output voltage of the voltage boosting/lowering converter 6 to the peak value of the voltage resulting from one of the voltages of the first group excluding the highest one.

A DC power supply unit 52 provides DC power to operate the converter control unit 18 and the inverter control unit 33. The DC power supply unit 52 rectifies and smoothes the AC voltage applied between the input terminals 2a and 2b and converts the resulting DC voltage to a voltage of a predetermined value, so that, whichever one of the voltages of the first and second groups is applied to the input terminals 2a–2c, a DC voltage of a fixed value can be supplied to the converter control unit 18 and to the inverter control unit 33.

In place of the DC power supply unit 52, a DC-to-DC converter may be used. The DC-to-DC converter lowers the output voltage of the voltage boosting/lowering converter 6, which always develops a fixed DC voltage, to the predetermined, fixed voltage, and supplies it to the converter control unit 18 and to the inverter control unit 33.

The inverter 24 used in the above-described embodiment is a half-bridge inverter, but a full-bridge inverter may be used instead. Also, bipolar transistors or FETs may be used in place of the IGBTs used as high-frequency semiconductor switching devices in the inverter 24 and the voltage boosting/lowering converter 6.

What is claimed is:

1. A DC power supply apparatus comprising:

an input-side rectifier receiving and rectifying an AC voltage selected from a first group of AC voltages having different values and a second group of AC voltages having different values which are lower than the values of the AC voltages of said first group;

a voltage boosting/lowering converter for converting an output voltage of said input-side rectifier;

an inverter for converting an output voltage of said voltage boosting/lowering converter to a high frequency voltage;

a transformer for voltage-transforming the high-frequency voltage outputted from said inverter;

an output-side rectifier for rectifying a voltage-transformed high-frequency voltage from said transformer;

an output voltage detector detecting said output voltage of said voltage boosting/lowering converter and developing an output-voltage-representative signal representing the detected output voltage; and a converter control unit receiving said output-voltage-representative signal and controlling said voltage boosting/lowering converter in such a manner that the output-voltage-representative signal represents a peak value of a voltage which would result from rectifying one of said AC voltages except the highest one.

2. The DC power supply apparatus according to claim 1 wherein said voltage boosting/lowering converter comprises a reactor, a high-frequency switching device connecting said reactor between outputs of said input-side rectifier, and a unidirectional device connected between said reactor and said inverter in such a manner that current can flow from said reactor to said inverter when said high-frequency switching device is nonconductive; and said converter control unit controls the conduction period of said high-frequency switching device.

3. The DC power supply apparatus according to claim 2 wherein:

said inverter includes high-frequency switching devices for switching the output voltage of said voltage boosting/lowering converter at a high frequency, and an inverter control unit for ON-OFF controlling the high-frequency switching devices of said inverter; and said DC power supply apparatus further includes a DC power supply unit for preparing a DC voltage from the AC voltage applied to said input-side rectifier and providing DC power to said converter control unit and to said inverter control unit.

4. The DC power supply apparatus according to claim 2 wherein:

said inverter includes high-frequency switching devices for switching the output voltage of said voltage boosting/lowering converter at a high frequency, and an inverter control unit for ON-OFF controlling the high-frequency switching devices of said inverter; and said DC power supply apparatus further includes a DC power supply unit for preparing a DC voltage from the output voltage of said voltage boosting/lowering converter and providing DC power to said converter control unit and to said inverter control unit.

5. The DC power supply apparatus according to claim 1 wherein said converter control unit controls said voltage boosting/lowering converter in such a manner that said output-voltage-representative signal represents a peak value of a voltage which would result from rectifying one of said AC voltages, except the highest one, in said first group.

* * * * *